United States Patent [19]

Norman

[11] 4,421,734

[45] Dec. 20, 1983

[54] SULFURIC ACID-SULFUR HEAT STORAGE CYCLE

[75] Inventor: John H. Norman, LaJolla, Calif.

[73] Assignee: GA Technologies Inc., San Diego, Calif.

[21] Appl. No.: 377,124

[22] Filed: May 11, 1982

[51] Int. Cl.³ .............................................. C01B 1/16
[52] U.S. Cl. ................................ 423/648 R; 423/522;
423/539; 423/543; 423/567 R; 423/659;
126/436; 60/641.9; 60/641.15
[58] Field of Search ............... 423/522, 531, 539, 540,
423/567 R, 543, 659, 648 R; 60/659, 641.8,
641.9, 641.13, 641.14, 641.15; 126/430, 436

[56] References Cited

U.S. PATENT DOCUMENTS

| 1,901,249 | 3/1933 | Lincoln | 423/567 |
|---|---|---|---|
| 2,359,319 | 10/1944 | Lepsoe | 423/567 |
| 3,005,687 | 10/1961 | Udy | 423/522 |
| 3,359,069 | 12/1967 | Furkert et al. | 423/540 |
| 4,089,939 | 5/1978 | Norman et al. | 423/648 R |
| 4,089,940 | 5/1978 | Norman et al. | 423/648 R |
| 4,314,982 | 2/1982 | Norman et al. | 423/539 |

FOREIGN PATENT DOCUMENTS 2042483 9/1980 United Kingdom ................ 423/539

OTHER PUBLICATIONS

A. Braggi, G. Beghi, "Decomposition of Sulphuric Acid Using Hot Air A Process Applied to Thermochemical Cycles for Hydrogen Production".
Conference: "Energy to the 21st Century", Proceedings of the 15th Intersociety Energy Conversion Engineering Conference, pp. 2003-2007.

Primary Examiner—Edward J. Meros
Assistant Examiner—Jackson Leeds
Attorney, Agent, or Firm—Fitch, Even, Tabin & Flannery

[57] ABSTRACT

A method of storing heat is provided utilizing a chemical cycle which interconverts sulfuric acid and sulfur. The method can be used to levelize the energy obtained from intermittent heat sources, such as solar collectors. Dilute sulfuric acid is concentrated by evaporation of water, and the concentrated sulfuric acid is boiled and decomposed using intense heat from the heat source, forming sulfur dioxide and oxygen. The sulfur dioxide is reacted with water in a disproportionation reaction yielding dilute sulfuric acid, which is recycled, and elemental sulfur. The sulfur has substantial potential chemical energy and represents the storage of a significant portion of the energy obtained from the heat source. The sulfur is burned whenever required to release the stored energy.

A particularly advantageous use of the heat storage method is in conjunction with a solar-powered facility which uses the Bunsen reaction in a water-splitting process. The energy storage method is used to levelize the availability of solar energy while some of the sulfur dioxide produced in the heat storage reactions is converted to sulfuric acid in the Bunsen reaction.

11 Claims, 1 Drawing Figure

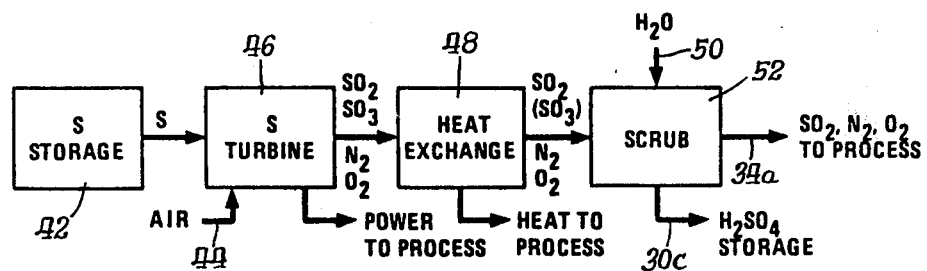
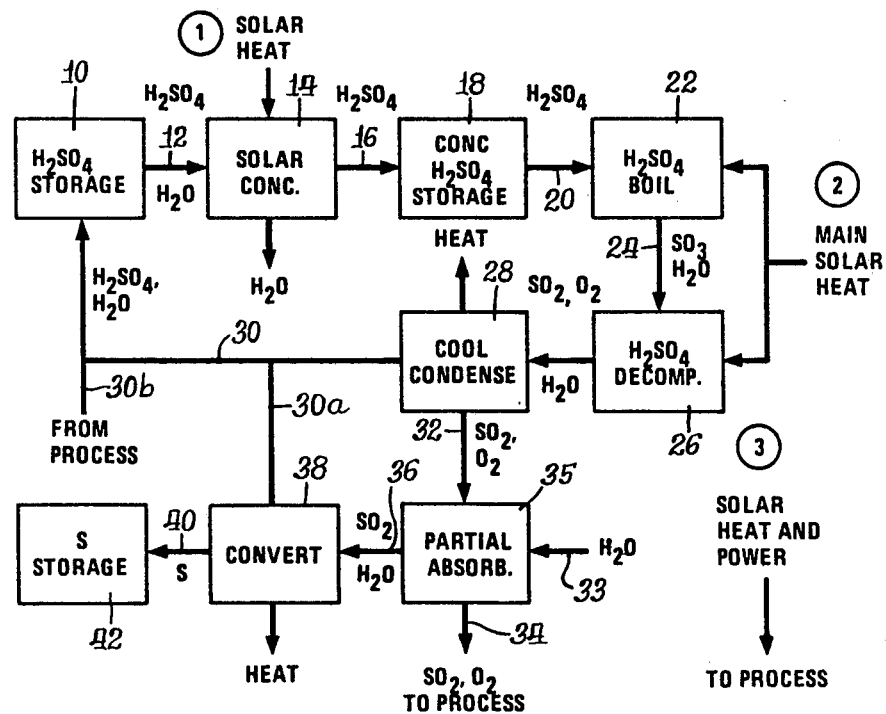

SULFURIC ACID-SULFUR HEAT STORAGE CYCLE

The Government has rights in this invention pursuant to Contract No. DE-AC01-80CS80004 awarded by the U.S. Department of Energy.

The present invention relates to heat storage systems and more particularly to thermochemical heat storage systems.

BACKGROUND OF THE INVENTION

Solar energy is receiving wide-spread attention as a means of reducing the demand on conventional energy sources. Most activity has centered on using solar energy to provide heat and electricity; however, solar energy may also be used to drive energy-intensive chemical processes, such as the splitting of hydrogen from water.

The feasibility of using solar energy for various purposes in many cases depends on the practicality of energy storage systems to make the energy from the intermittent source continuously available. A plant using solar ray collectors as its source of energy and having an efficient energy storage system may be built to one-fifth or less the size of a plant with the same output capacity that does not have an energy storage system.

Means of storing energy to levelize the energy obtainable from intermittent sources include sensible heat reservoirs, such as rocks, oil or molten salts, heat-of-fusion or vaporization reservoirs, such as metals, compounds, salt compositions or hydrates and chemical heat storage cycles. The criteria for choosing a heat storage system include energy density, energy quality, energy delivery requirements and media stability, and different types of heat storage may be preferred for different processes. Sensible heat storage facilities require large volumes of heat-retentive material and are undesirable in this respect. Heat-of-fusion salt compositions have minimal energy delivering requirements, and sensible heat inserted into the salt compositions can be withdrawn with only heat exchanger $\Delta T$ losses. The heat obtainable from molten salts approach theoretical efficiency. Hence, molten salts are often the energy storage systems of choice for short-term storage, e.g., to levelize energy during the diurnal cycle. For longer term storage, tankage and inventory costs of salt heat storage systems become critical. Furthermore, the maximum draw salt temperature in state-of-the-art salt heat storage systems is about 600° C. limiting the usefulness of heat storage systems in processes which require high temperature heat. For long-term heat storage, chemical cycles can prove to be the most cost effective, and a system which depends upon generally uniform availability of solar energy over the seasonal cycle requires an efficient, economical chemical heat storage cycle. An important consideration in the evaluation of chemical heat storage systems is the cost of chemical tankage, and to this end, the inventory products of the heat storage systems should be liquids and/or solids rather than gases. Such chemical energy storage systems generally provide much higher energy densities than other energy storage systems requiring far less tankage volume than sensible or heat-of-fusion systems.

The need continues for efficient, economical heat storage systems, particularly those which can deliver high temperature heat.

SUMMARY OF THE INVENTION

A system is provided in which energy from an external heat source is stored as potential chemical energy by producing sulfur from sulfuric acid. Dilute sulfuric acid is concentrated with heat from the external source or with heat generated elsewhere in the system. The concentrated sulfuric acid solution is decomposed to yield sulfur dioxide in a highly endothermic reaction by the application of intense heat from the external source, such as a solar collector. The recovered sulfur dioxide is reacted with water in a disproportionation reaction yielding dilute sulfuric acid which is recycled and elemental sulfur. The elemental sulfur, with its substantial potential chemical energy, may be stored for any length of time until it is needed as a source of intense heat, its chemical energy to be recovered through combustion.

BRIEF DESCRIPTION OF THE DRAWING

The FIGURE is a diagrammatic illustration of day and night plants, embodying various features of the invention, of a facility in which solar energy is collected, stored and delivered to a chemical process plant.

DETAILED DESCRIPTION OF THE PREFERRED EMBODIMENTS

In accordance with the present invention, a system is provided in which energy from a heat source is stored by using the heat to convert sulfuric acid to elemental sulfur. Dilute sulfuric acid is concentrated with the application of heat, and concentrated sulfuric acid is thermally decomposed with heat from the source to yield sulfur dioxide and oxygen. In a disproportionation reaction, sulfur dioxide is reacted with water to yield dilute sulfuric acid, which is recycled through the energy storage system, and elemental sulfur, which has substantial potential chemical energy. Energy is recovered by combustion of the sulfur.

In accordance with a preferred aspect of the invention, the heat storage system is used to levelize the energy available to a chemical process which utilizes some of the $SO_2$ produced in the energy storage system and converts it to sulfuric acid which is then recycled through the energy storage system. Such a chemical process is a water-splitting process based on the Bunsen reaction.

The reactions of a sulfur-sulfuric acid chemical energy storage system and the energetics thereof are summarized in Table 1 below. The enthalpies (H) of the reactions at 298° C. are expressed in kcal./mole.

TABLE 1

| | $H_{298}$ |
|---|---|
| I. $3H_2SO_4$ (57.6%) $\longrightarrow 3H_2SO_4$ (conc) | 38.7 |
| II. $3H_2SO_4$ (conc) $\longrightarrow 3H_2O(l) + 3SO_2 + 3/2\ O_2$ | 162.3 |
| III. $2H_2O(l) + 3SO_2 \longrightarrow 2H_2SO_4$ (57.6%) + S(l) | −62.2 |
| IV. $S(l) + O_2 \longrightarrow SO_2$ | −71.8 |
| (a) $SO_2 + H_2O(l) + \frac{1}{2} O_2 \longrightarrow H_2SO_4$ (57.6%) | −67.0 |

The sulfuric acid dehydration (I) and the sulfuric acid decomposition (II) are endothermic and represent energy storage steps. The disproportionation reaction (III), in which elemental sulfur is produced, is exothermic producing low quality heat that may be used either in an associated chemical process or elsewhere in the heat storage system, e.g., in the dehydration of sulfuric acid (I). The combustion of sulfur (IV) represents the important energy recovery step, producing high temperature heat that is useful either to drive an energy intensive chemical process or to generate electricity.

Step (a), in which sulfur dioxide is shown as being converted to sulfuric acid, does not represent an actual reaction but rather represents the chemical equation that completes a heat storage cycle. Step (a) is preferably accomplished in a linked chemical process in which sulfur dioxide is converted to sulfuric acid, and herein, the heat storage cycle will be discussed as being linked to a water-splitting cycle utilizing the Bunsen reaction, as described in U.S. Pat. Nos. 4,089,939 and 4,089,940, both issued May 16, 1982 in the name of John H. Norman et al., the teachings of which are incorporated herein by reference. The reactions involved in the water-splitting cycle are listed in Table 2 below.

TABLE 2

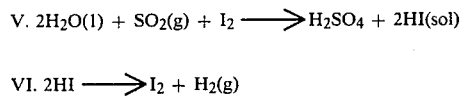

VI. $2HI \longrightarrow I_2 + H_2(g)$

Reaction V is the Bunsen reaction which produces hydrogen iodide by the reaction of $SO_2$ and $I_2$ with water. The Bunsen reaction also satisfies step (a) of Table I, completing the heat storage cycle by converting sulfur dioxide, supplied from the heat storage reactions, to sulfuric acid, which is recycled to reaction (I). Reaction VI is the thermal decomposition of hydrogen iodide to produce hydrogen ($H_2$).

The net effect of reactions I–VI is the splitting of a mole of water by the input of thermal energy to produce one mole of hydrogen and one-half mole of oxygen. Thus, from the net input of energy, a very desirable fuel, hydrogen, is obtained.

The energy storage system will now be described with reference to a facility which uses exclusively solar power to generate hydrogen. The facility includes a solar energy day plant, a chemical energy (stored solar energy) might plant and a process plant in which the water-splitting reactions are carried out. The day plant operates on available insolation providing heat and power to the process plant. The day plant also uses collected solar energy not immediately needed in the process plant to drive the endothermic energy storage reactions. The night plant releases the stored chemical energy to generate both power, including electrical power, and heat required to operate the process plant during periods of insufficient insolation. The capacities of the day and night plants are balanced to the energy requirements of the process plant so that the process plant operates continuously with substantially uniform output. The process plant will not be described in detail because water-splitting processes, which utilize sulfur dioxide in the production of hydrogen, are fully described in above-mentioned U.S. Pat. Nos. 4,089,939 and 4,089,940.

The primary function of the day plant is to supply power and heat to the process plant because using direct solar energy to produce hydrogen is more efficient than using stored energy. Beyond its primary function, the day plant concentrates sulfuric acid produced in the process plant and in the disproportionation reaction. Concentrating the sulfuric acid not only prepares the sulfuric acid for the decomposition reaction but reduces the tankage required for sulfuric acid. Finally, through the sulfuric acid decomposition reaction and the disproportionation reaction, the day plant produces sulfur which represents the energy source for operating the night plant.

With reference to the diagrammatic illustration of the day plant at the lower portion of the FIGURE, solar energy is used (1) for sulfuric acid concentration, (2) for sulfuric acid boiling and decomposition and (3) in directly supplying solar heat and power to the water-splitting process.

Beginning at the upper left hand corner of the FIGURE, dilute sulfuric acid from a storage tank 10 is withdrawn through line 12 to a concentrator 14. The concentrator 14 is a series of tanks through which heat exchange tubes from a variety of heat sources pass in contact with the sulfuric acid. The primary source of heat for evaporating water from the concentrator 14 is low quality heat from solar receivers, but the concentrator preferably utilizes other low quality heat produced in the facility. Concentration of sulfuric acid is a low priority use of solar power; however, at times of minimal insolation, e.g., during the late afternoon and early morning, the concentrator 14 may utilize substantially all of the solar energy collected. The pressure in the concentrator is atmospheric or above and the temperatures in the concentrator may vary from about 130° C. to nearly 400° C., depending on the stage of concentration of the sulfuric acid and the pressure. Dilute sulfuric acid, which typically enters the concentrator 14 at about 57% (by weight) concentration, is concentrated to at least about 90 percent by weight, and preferably to more than about 95 percent by weight. It is desirable to concentrate the sulfuric acid as much as possible to minimize the energy required to boil sulfuric acid.

The concentrated sulfuric acid from the concentrator 14 flows through line 16 to a concentrated sulfuric tank 18. This tank 18 is much larger than the dilute sulfuric acid storage tank 10 because the total amount of sulfuric acid varies seasonally, and for tankage efficiency it is preferable to store the large volume of sulfuric acid that accumulates during the winter months as concentrated rather than as dilute sulfuric acid.

Concentrated sulfuric acid is withdrawn from the concentrated sulfuric acid storage tank 18 according to the solar power available for reaction II which includes sulfuric acid boiling and decomposition. Boiling and subsequent heating of sulfuric acid results in its dehydration forming sulfur trioxide and water, and sulfur trioxide heated to still higher temperatures decomposes in a reversible reaction to yield sulfur dioxide and oxygen. At increasing temperature, the equilibrium of the $SO_3$ decomposition reaction shifts increasingly to the right, i.e., towards the the production of sulfur dioxide.

For most efficient use of collected solar energy, the boiling and decomposition of sulfuric acid occur directly in solar receivers 22, 26 to which solar rays are directed, e.g., with focussing mirrors. The sulfuric acid from the tank 18 passes through line 20 to the receiver 22 where the sulfuric acid is boiled at temperatures of between about 350° C. and about 550° C. producing pressures of between 60 and about 100 psig.

From the boiling receiver 22, the boiled, pressurized water and $SO_3$ flow through line 24 directly to a section of the solar receiver 26 where the gases are passed through packed catalytic beds at pressures of about 60 to 100 psig and further heated to between about 400° C. and 900° C. and generally above 860° C. Suitable catalysts for the bed are described in U.S. Pat. No. 4,314,982, issued Feb. 9, 1982 in the name of John H. Norman et al., the teachings of which are incorporated herein by reference. With an appropriate flow-through residence time in the receiver 26, e.g., between about 1 and 20 seconds, the reversible decomposition reaction approaches or exceeds 95% of its equilibrium.

To prevent the rapid recombination of sulfur dioxide and oxygen to reform sulfur trioxide as the equilibrium of the decomposition reaction shifts to the left at lower temperatures, the hot product gases from the solar receiver 26 are very rapidly cooled in a heat exchanger 28 in the absence of catalyst to where the rate of combination is negligible, effectively quenching the reverse reaction. In the cooled heat exchanger 28, the temperature of the gases is dropped rapidly, e.g., from above 860° C. to below 300° C. in less than ten seconds. During cooling, unreacted sulfur trioxide rehydrates and condenses as sulfuric acid which is returned through line 30 to the dilute sulfuric acid storage tank 10 (or tank 18 if sufficiently concentrated). The sensible heat of the product gases, that is now transferred to the coolant, is used elsewhere in the system, e.g., to heat the sulfuric acid in the concentrator 14. The temperature of the product gasses is finally cooled to below about 20° C. to enhance solubility of $SO_2$ in water.

With the water and sulfuric acid condensed and returned to storage tanks, the product gas stream contains a mixture of approximately one-third oxygen and two-thirds sulfur dioxide. This gas mixture is directed through line 32 to a partial absorption chamber 35. To the extent that it is required in the process plant, the sulfur dioxide entering the absorption chamber 35 is redirected through line 34 to the process plant, and until sufficient insolation is available to produce excess sulfur dioxide, 100 percent of the sulfur dioxide produced by $SO_3$ decomposition is passed directly to the process plant for use in the Bunsen reaction (V). When however, excess sulfur dioxide is available for disproportionation (III), cold liquid water is sprayed into the absorption chamber contacting the gases and stripping a portion of the sulfur dioxide from the gases. Water carrying dissolved sulfur dioxide flows through line 36 to a converter 38 where the disproportionation reaction is carried out.

The temperature and the pressure in the absorption chamber 35 may be varied, keeping in mind that $SO_2$ solubility is dependant on the pressure and temperature and that concentrated sulfuric acid is desired as a product. This means that high solubilities are desirable. Thus colder absorbing solutions (including sulfuric acid solutions) and higher pressures are desirable. At a given temperature and pressure the amount of sulfur dioxide stripped from the gases in the partial absorption chamber 35 is generally proportional to the amount of the water sprayed thereinto becoming nearly saturated with $SO_2$, and by adjustment of the water spray, the proportions of the sulfur dioxide alternately absorbed in the chamber 35 and carried to the converter 38 or directed to the process plant can be controlled within the limits of the desired strength of the $SO_2$ solutions.

The disproportionation reaction is autocatalytic, $S_2O_3^=$ being an intermediate as well as a catalyst. The disproportionation converter 38 is preferably pressurized above about 50 psig and more preferably to between about 300 psig and about 1500 psig or higher depending upon the limits of the reactor. The temperature is maintained at about 120° to about 180° C., typically 150° C. The reaction is carried out for a time sufficient to react at least about 85 percent of the sulfur dioxide. At 150° C., about 95% of the $SO_2$ disproportionates within an hour, a rate that is reasonable compared to the 12 hour average holding time of the sulfur and $H_2SO_4$ products.

The converter 38 is large because the disproportionation reaction is slow, requiring about an hour of holding time in the converter 38, compared to other reactions of the energy storage system which require seconds to a minute or two of holding time in the other processing units. The converter 38 processes three times as much sulfur dioxide daily (but in only one-half day) as the process plant processes in a full day. Nevertheless, the converter 38, which may include a stirred reactor, is simple, runs at relatively low temperature (about 150° C.) and is not in as corrosive an environment as are many of the other reaction units. Therefore, the converter 38 is not particularly expensive, although it may contain more than an order of magnitude more reactants than any other processing unit at any time.

The converter 38 is actually a series of vessels or a multi-region processing unit. The reaction progresses at an operating temperature and pressure and for a sufficient time to produce 57 percent sulfuric acid and sulfur. In a first vessel, e.g. a stirrer reactor, cold water and sulfur dioxide are continuously introduced and a partially reacted, e.g., half reacted, mixture is continuously withdrawn to downstream vessels or regions. Cold reactants introduced into the first vessel or region are brought to the operating temperature utilizing some of the heat produced in the reaction, and by introducing reactants continuously into this vessel, the autocatalytic intermediates are always available. Downstream of the first vessel are holding tanks or a column through which the partially reacted mixture flows slowly allowing the partially reacted mixture to further react until the desired 57% sulfuric acid is produced. 57% sulfuric acid passes through line 30a, 30 to the dilute sulfuric acid storage tank 10 which also receives dilute sulfuric acid from the process plant through lines 30b, 30. The excess heat (that which is not used to heat the cold reactants) produced in the convertor 38 is extracted by heat exchangers (not shown) and used elsewhere in the facility, e.g., to concentrate sulfuric acid.

The sulfur produced from a disproportionation reaction carried out at about 150° C. is liquid and not particularly viscous. It forms a separate phase from the sulfuric acid solution and flows through line 40 to a sulfur storage area 42. The sulfur may actually be stored in several receptacles in the area 42 including receptacles where the sulfur is maintained as a liquid for withdrawal in liquid phase for diurnal cycle burning in the night plant. For seasonal storage of sulfur, it is impractical to maintain the sulfur at liquid temperatures, and the seasonally stored sulfur is stored in receptacles where the sulfur is allowed to cool and solidify. It is preferred that at least some of the heat-of-fusion of the seasonally stored sulfur be recovered, e.g., by using the heat of the sulfur for sulfuric acid concentrating. Prior to use, the seasonally stored sulfur may be heated to liquify the same so that the sulfur may be pumped as a liquid into the night plant.

The night plant operates in a relatively straightforward manner supplying power, heat and $SO_2$ to the process plant. It can be operated at any time it is needed to satisfy the requirements of the process plant. Sulfur is withdrawn in liquid form from the sulfur storage area 42 and burned with compressed air from supply line 44 to produce heat of sufficient intensity, e.g., about 1200° C. to operate a gas turbine 46 which supplies power, including electrical power, to the process plant. Although burning sulfur may be used to generate temperatures up to about 2000° C., the burn temperature of the sulfur should not exceed the temperature capacity of the turbine, and typically sulfur is burned under conditions of air inflow to obtain a temperature of about 1200° C. to operate a ceramic blade (SiC) turbine. The combustion product gases, including sulfur dioxide, sulfur trioxide and the $N_2$ and $O_2$ of the air, flow through a heat exchanger 48 which withdraws heat from the combustion gases and transfers it to the process plant where the heat is used in recovery and thermal decomposition of hydrogen iodide. The combustion product gases are then contacted with water from a supply line 50 in a scrubber 52 to remove $SO_3$ by hydrating it to sulfuric acid. Sulfuric acid is passed through line 30c to the sulfuric acid storage tank. The scrubbed gas mixture is directed through line 34a to the process plant where the $SO_2$ is utilized in the Bunsen reaction water-splitting process.

It should be noted that the day and night plants supply sulfur dioxide-containing gas streams of various $SO_2$ enrichment to the process plant, and the process plant is adapted to compensate for the variable concentration of sulfur dioxide. The gas stream from the night plant is lowest in sulfur dioxide enrichment, containing $O_2$ and $N_2$ from the air used to burn the sulfur. After switch-over to the day plant for energy, the stream of gas from the sulfuric acid decomposition reaction provides a mixture of two-thirds sulfur dioxide and one-third oxygen, a fairly rich sulfur dioxide gas stream. Later, when sufficient $SO_2$ is generated to begin the disproportionation reaction, $SO_2$ is depleted from the gas stream enriching the stream in oxygen. Although the $SO_2$ from the night plant is the limiting design factor in that the $SO_2$ must be stripped from its most dilute source, the day plant feeds a gas stream to the process plant that is continually varying in $SO_2$ enrichment.

Operation of the day and night plants are not exclusive, and the night plant may be operated to supplement the day plant during periods of insufficient insolation. Whenever possible, the process plant runs entirely from the energy produced by the day plant as the directly generated energy of the day plant is less expensive than the stored energy obtained from the night plant. In a typical day, the night plant supplements the day plant during the early morning and late afternoon hours when insufficient temperatures can be developed to decompose the sulfuric acid. During this time, the energy from the day plant may be used to dehydrate stored sulfuric acid. As soon as insolation is sufficient to supply the process plant, the day plant is utilized to this effect. Additional insolation is divided among the options of increased sulfur dioxide production (from sulfuric acid decomposition) and sulfuric acid dehydration, depending on plant capacities. The sulfur dioxide disproportionation process is started up as soon as sulfur dioxide in excess of that needed in the process plant is available.

Although the day and night plants are illustrated diagrammatically as completely separate entities, there may be some considerable exchange between the two, and the day and night plants may operate using shared equipment. For example, the turbine, which operates from burning $SO_2$ in the night plant to generate shaft and electrical power for use in the process plant, may be operated from solar heated air of the day plant. Excess heat generated in the night plant may be used for keeping day plant reactors hot and ready to operate.

The energy requirements of the water-splitting process plant are satisfied by burning just enough sulfur in the night plant to supply the sulfur dioxide needed in the Bunsen reaction. The capacity of the night plant is closely matched to the capacity of the process plant as the efficiency of the combined night plant and process plant is maximized when only enough sulfur is burned to supply the Bunsen reaction of the process plant.

The size of the day plant is sufficient to generate enough energy for operating the process plant during periods of insolation as well as storing sufficient chemical energy to run the night plant whenever its operation is indicated. In order that the tasks of the day plant be accomplished without exorbitant size, the facility is preferably located in any area of generally constant insolation, and preferably located below about 40° latitude. Such conditions can be found in the deserts in the southwest United States.

An important aspect of the energy storage system of the present invention is that both sulfur and sulfuric acid are relatively inexpensively stored for long periods of time. The storage system can, therefore, be conveniently used to level not only the daily availability of solar energy but the seasonal availability of solar energy as well. During the spring and summer months, the increased insolation is used to accumulate an excess of sulfur. During the fall and winter months, the night plant is operated for longer periods of time resulting in a net accumulation of sulfuric acid. Thus a given quantity of sulfur is seasonally cycled through the system once each year. The build-up of either sulfur or sulfuric acid, of course, is not continuous during the seasonal periods but fluctuates according to weather conditions as well.

Inventory costs for the sulfur and sulfuric acid are very low. The basis chemical cost is for the sulfur required during the first winter of operation. When the heat storage system is used in conjunction with a Bunsen reaction water-splitting cycle, one mole of sulfur is used to produce one mole of hydrogen. The cost of one mole of sulfur is roughly equal to the cost of one mole of hydrogen; however, the sulfur is recycled through the processes generating numerous moles of hydrogen for each mole of sulfur once a year for truly seasonally required sulfur.

One of the major capital costs of a solar plant is the mirrors of the solar collectors, and the solar plant is designed to obtain maximum mirror utilization for day plant chemical operation. Because operation of the day plant is multifaceted with different steps sometimes operating at different times, the mirror field is designed for versatility. A multitarget-multitower system is preferred for a solar powered plant in which the utilization of power in different facets of the processes is continually changing. A plurality of towers each have several receivers stacked as a function of height. At least certain mirrors are directable to a choice of targets on the tower, and some mirrors may be fully redirectable to different towers. In addition to collectors which produce high-intensity beams, collectors which produce less focused beams satisfactorily supply the heat for those processes requiring less intense heat.

The efficiency of thermochemical facilities are enhanced with increased size, however, a large facility requires a large solar mirror field, and a large mirror field results in long pumping distances for chemical reactants and products. At the present time it appears that for the systems described herein, a facility of about 200-MW is the most efficient size for producing hydrogen. Such a facility will produce about 34 kg/min of $H_2$. The layout of this facility has a mirror field ring surrounding a central plant with six multipurpose receivers towers spaced around the central plant.

Although the energy storage system of the invention has been described above with reference to a linked water-splitting process, the energy storage system is applicable for providing the energy source needed to drive other energy intensive chemical processes as well. When used in conjunction with processes which do not interchange chemicals between the heat storage reactions and the process reactions, the sulfur dioxide product of combustion is disproportionated in reaction III to maintain the cyclical nature of the energy storage system.

The heat storage system is also usable in a facility in which electricity is generated from solar energy. With reference to the above-described facility, turbine electrical generation is a minor function; however, where generation of electricity is the primary product of a solar plant, intensely heated combustion products of sulfur, which can be directly used to drive turbines, provide for much more efficient electrical generation than systems which use lower quality heat to produce steam for electrical generation.

Several advantages of the invention may now be more fully appreciated. Most notable is that a chemical storage system is provided which can be efficiently utilized to levelize not only the diurnal cycle but the seasonal cycle as well. Levelizing the available energy permits a solar powered facility to be built one-fifth the size that would be required if the facility were to operate intermittently during periods of substantial insolation. Furthermore, providing for continuous operation of the facility obviates very substantial engineering problems inherent in a facility which operates only intermittently when solar energy is available. For a water splitting plant, where the reactions require large reactor vessels and heat exchangers, the levelizing effect of the chemical energy storage system provides enormous capital savings. The stored products of the heat storage system, namely sulfur and concentrated sulfuric acid, are relatively inexpensively stored as, for example, in lined concrete tanks. The heat released by the combustion of sulfur is of high quality and can be used to drive very energy intensive chemical processes or to efficiently generate electricity.

While the invention has been described in terms of a preferred embodiment, modifications obvious to one with ordinary skill in the art may be made without departing from the scope of the invention. In a solar powered facility, the chemical storage system might be used in conjunction with sensible heat or heat-of-fusion energy storage systems, the chemical storage system being used primarily to level the seasonal and weather related cycles and the sensible or heat-of-fusion energy storage system being used primarily to levelize the diurnal cycle. The system might also be used to store heat from a source, e.g., a nuclear reactor, which can produce a constant supply of thermal energy but from which the energy demand varies. Rather than decrease the output of a reactor during off-peak load periods, the excess heat may be stored using the energy storage method of the invention, and the sulfur burned to produce heat useful in electrical generation to supplement the electrical output of the reactor facility during peak load periods.

Various features of the invention are set forth in the following claims:

What is claimed is:

1. A cyclical method of storing energy intermittently collected from an external heat source and then supplying heat by using the stored energy to adjust the availability of the energy to energy requirements, the method comprising the steps of
    (a) collecting heat from the external source,
    (b) concentrating a dilute sulfuric acid solution to at least about 90 percent by weight,
    (c) thermally decomposing said concentrated sulfuric acid solution using the energy collected from said external source to yield sulfur dioxide and oxygen,
    (d) reacting sulfur dioxide with water at temperatures of between about 120° C. and about 180° C. at pressures of between about 50 psig and about 1500 psig to yield dilute sulfuric acid and elemental sulfur, said reaction of sulfur dioxide and water being carried out for a period of time sufficient to react at least about 85 percent of the sulfur dioxide,
    (e) recycling the dilute sulfuric acid to an earlier step,
    (f) storing said elemental sulfur,
    (g) subsequently removing said stored sulfur from storage and oxidizing said elemental sulfur to retrieve the stored energy to fulfill the energy requirements and producing sulfur dioxide, and
    (h) recycling the sulfur dioxide resulting from said oxidation to step d.

2. A method according to claim 1 wherein said heat source is a solar heat collection facility.

3. A method according to claim 1 wherein said concentrated sulfuric acid is decomposed by boiling at temperatures of about to 350° C. and about 550° C. to yield sulfur trioxide and water, which sulfur trioxide is heated to between about 400° C. and about 900° C. to yield sulfur dioxide and oxygen.

4. A method according to claim 1 wherein at least a portion of the sulfur is stored in liquid form.

5. A method according to claim 1 carrying out said reaction between sulfur dioxide and water in stages including an upstream stage and a downstream stage, wherein sulfur dioxide and water are introduced to said upstream stage, and a partially reacted mixture is withdrawn from said upstream stage and transferred downstream, withdrawal of said partially reacted mixture being coordinated with said introduction of sulfur dioxide and water to assure a sufficient concentration of the autocatalytic intermediate, $S_2O_3^=$, in said upstream stage, and recovering sulfuric acid and sulfur from said downstream stage.

6. A method according to claim 5 wherein said withdrawn sulfuric acid is at least about 57 weight percent $H_2SO_4$.

7. A method according to claim 1 wherein said reaction between sulfur dioxide and water is effected at pressures of between about 300 psig and about 1500 psig.

8. A method of supplying the thermal energy requirements of a chemical process which requires continuous input of thermal energy comprising
   intermittently collecting thermal energy from an external heat source,
   fulfilling the thermal energy requirements of said chemical process with collected energy during periods when the collected energy is sufficient,
   storing collected thermal energy in excess of that required by said chemical process in a heat storage process,
   recovering stored energy to fulfill the energy requirements of said chemical process during periods when said collected thermal energy is insufficient for the energy requirements of said chemical process and producing sulfur dioxide,
   the heat storage and recovery process comprising of the steps of
   (a) concentrating a dilute sulfuric acid solution to at least about 90 weight percent with said collected thermal energy,
   (b) thermally decomposing said concentrated sulfuric acid solution using said collected thermal energy to yield sulfur dioxide and oxygen,
   (c) reacting sulfur dioxide with water at temperatures of between about 120° C. and about 180° C. and at pressures of between about 50 psig and about 1500 psig to yield dilute sulfuric acid and elemental sulfur, said reaction of sulfur dioxide and water being carried out for a period of time sufficient to react at least about 85 percent of the sulfur dioxide,
   (d) storing said elemental sulfur created by said reaction,
   (e) subsequently removing said stored elemental sulfur from storage and oxidizing said elemental sulfur to retrieve its stored energy,
   (f) recycling the sulfur dioxide resulting from said oxidation to step c.

9. A method according to claim 8 wherein said concentrated sulfuric acid is decomposed by boiling at temperatures of about 350° C. and about 550° C. to yield sulfur trioxide and water, which sulfur trioxide is heated to between about 400° C. and about 900° C. to yield sulfur dioxide and oxygen.

10. A method of providing energy collected intermittently from an external heat source to a water-splitting chemical process including the Bunsen reaction, the method comprising
    collecting thermal energy from the external heat source,
    fulfilling the thermal energy requirements of said water-splitting process with collected energy during periods when the collected energy is sufficient,
    storing collected thermal energy in excess of that required by said chemical process in a heat storage process, and
    recovering stored energy to fulfill the energy requirements of said water-splitting process during periods when said collected thermal energy is insufficient for the requirements of the water-splitting process,
    the heat storage and recovery process comprising the steps of
    (a) concentrating a dilute sulfuric acid solution to at least about 90 weight percent with said collected thermal energy,
    (b) thermally decomposing said concentrated sulfuric acid solution using said collected thermal energy to yield sulfur dioxide and oxygen,
    (c) reacting a portion of said sulfur dioxide with water to yield dilute sulfuric acid and elemental sulfur,
    (d) providing a portion of said sulfur dioxide to said water-splitting process, said water-splitting process producing sulfuric acid,
    (e) returning the sulfuric acid produced in said water-splitting process to step a,
    (f) storing said elemental sulfur created by said reaction,
    (g) subsequently removing said stored elemental sulfur from storage and oxidizing said elemental sulfur to retrieve its stored energy, thereby producing sulfur dioxide, and
    (h) utilizing at least a substantial portion of the sulfur dioxide produced by said combustion in said water-splitting process.

11. A method according to claim 10 wherein said concentrated sulfuric acid is decomposed by boiling at temperatures of about 350° C. and about 550° C. to yield sulfur trioxide and water, which sulfur trioxide is heated to between about 400° C. and about 900° C. to yield sulfur dioxide and oxygen.

* * * * *